United States Patent

[11] 3,582,222

| [72] | Inventor | Rene Hoblik<br>Drancy, France |
|---|---|---|
| [21] | Appl. No. | 720,065 |
| [22] | Filed | Apr. 10, 1968 |
| [45] | Patented | June 1, 1971 |
| [73] | Assignee | Roussel Uclaf<br>Paris, France |
| [32] | Priority | Apr. 18, 1967 |
| [33] |  | France |
| [31] |  | 103,159 |

[54] SAMPLING CELLS
8 Claims, 2 Drawing Figs.

[52] U.S. Cl. .................................... 356/246,
250/218
[51] Int. Cl. .................................... G01n 1/10
[50] Field of Search ........................... 356/102-
—104, 204, 205, 208, 246; 250/218

[56] References Cited
UNITED STATES PATENTS

| 3,225,645 | 12/1965 | Baruch et al. ............... | 250/218X |
| 3,361,026 | 1/1968 | Ishimaru ..................... | 356/246 |
| 3,391,598 | 7/1968 | DeGrave, Jr. et al. ...... | 356/246 |
| 3,431,424 | 3/1969 | Allen ........................... | 356/246X |

FOREIGN PATENTS

| 1,124,144 | 8/1968 | Great Britain ............... | 356/246 |
| 1,425,115 | 12/1965 | France ........................ | 356/246 |
| 1,449,409 | 7/1966 | France ........................ | 356/246 |
| 1,355,402 | 8/1963 | France ........................ | 356/246 |

OTHER REFERENCES

Brady, et al. " Liquid Metal Sample Holder" Rev. Sci. Inst., V. 38, N. 6, Jun. 1967, pp. 736— 739 (356/246)

*Primary Examiner*—Ronald L. Wibert
*Assistant Examiner*—Warren A. Sklar
*Attorney*—Bacon & Thomas

ABSTRACT: A liquid sampling cell for use in examining liquids with visible or invisible light wherein the actual cell has an inlet pipe feeding liquid to the bottom of the cell and a drain pipe from the bottom of the cell. The top of the cell is connected to a suction pipe and the inlet and suction pipe are connected above the level of the cell by a bypass.

PATENTED JUN 1 1971  3,582,222

Inventor
RENÉ HOBLIK
By Baxter & Thomas
Attorneys

SAMPLING CELLS

BACKGROUND OF THE INVENTION

This invention concerns improvements in or relating to liquid sampling cells such as are used for carrying out optical measurements in instruments, of which the following are only examples: polarimeters, spectropolarimeters, spectrophotometers, apparatus for measuring dichroism and other devices for measuring and monitoring optically active solutions. Such cells which have at least two transparent opposite walls are in use placed in the path of a visible or invisible light beam.

The invention is more particularly concerned with the problem of filling such cells in situ, so as not to slow down the use of the instruments, and must therefore not only ensure, in a rapid manner, a constant liquid feed in the cell but also that such liquid is introduced into the cell without turbulence, so as to make it unnecessary to wait until the liquid has settled before making a measurement.

Accordingly the invention provides a liquid sampling cell for use in the examination by visible or invisible light of liquids comprising a recess or chamber for liquid, an inlet pipe for liquid connected to the lower part of said recess or chamber and a pipe for the application of suction connected to the upper part of said recess or chamber said inlet pipe and said suction pipe being connected together above the level of said recess or chamber by a by pass conduit.

Preferably the said inlet pipe, recess or chamber and the suction pipe are connected together in the form of a U with the inlet pipe and the suction pipe extending out of the upper surface of the cell.

Furthermore it is preferred to provide a conduit of larger diameter than the suction pipe between the suction pipe and the recess or chamber and a conduit of larger cross section than the inlet pipe between the inlet pipe and its connection to the lower part of the recess or chamber. Preferably said two conduits of larger cross section are of substantially the same dimensions.

It will be understood that it is within the scope of the invention to provide a scientific instrument for the examination of liquids by visible or invisible light which incorporates one or more cells as above set forth.

One preferred embodiment of the invention by way of example only will now be described with reference to the accompanying drawings in which.

Figure 1:
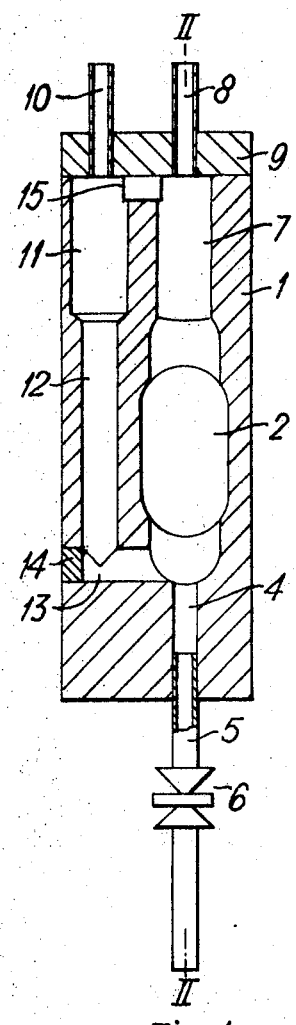
FIG. 1 shows a section of a device according to the invention on a vertical plane of symmetry through the actual liquid cell.
Figure 2:
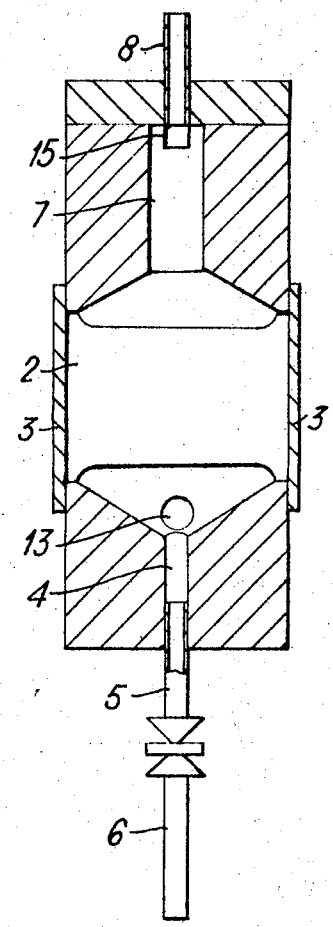
FIG. 2 is a section at right angles to that of FIG. 1 on the line II-II of FIG. 1.

The arrangement shown comprises a body 1 in the general shape of a rectangular parallelepiped made for example of corrosion-resistant metal, plastic or glass, machined or otherwise shaped and made of any desired number of parts which are connected together in a liquid tight manner to form a recess 2, which forms the actual liquid sampling cell. This cell 2 is closed at its two opposite sides by windows 3 which have the required transparency and are made preferably of a material not wettable by the liquids which are to be introduced. A vertical drain conduit 4 opens into cell 2 and a drain tube 5, in which a valve 6 is fitted, is connected to said conduit 4.

The cell 2 is connected directly with a conduit 7 which extends upwardly of the cell and which terminates in a suction pipe 8 of smaller diameter sealed into a cover 9 fitted in a liquid tight manner on the upper surface of the body 1.

This cover is also provided with a pipe 10 for the supply of liquid which pipe 10 opens into body 1 in a conduit which is preferably of the same height and diameter as the conduit 7 and is similarly positioned in the body 1. This second conduit 11 is substantially parallel to the conduit 7.

Inside body 1 the conduit 11 opens into a vertical conduit 12 the lower part of which communicates, via an inlet opening 13, which is for example horizontal, with the lower part of the cell 2. 14 is a sealing stopper for this opening which is formed in body 1. In the upper part of the body of the device a recess 15 is formed, which after fitting the cover 9, forms a bypass between the conduits 11 and 7.

The device operates as follows: with the cell 2 and its associated pipes empty the feed pipe 10 is connected for example by a flexible tube to a beaker or other vessel containing a quantity of liquid to be examined. Suction is then applied to pipe 8 and the liquid is drawn via conduit 11, pipe 12 and inlet 13 into the bottom of cell 2. When the cell 2 is filled the liquid rises into conduit 7. When the supply of liquid from the vessel is either exhausted or cut off the bypass conduit 15 which connects conduits 11 and 7 is exposed to atmospheric air and continued suction then draws air directly from pipe 10 to pipe 8 and passage of liquid into and through the cell ceases.

The liquid in the cell and in the conduits below the level of bypass 15 will remain undisturbed and since the cell has been filled by suction from below and allowed to overflow into conduit 7 there will be no turbulence in the liquid in the cell with the result that any desired measurements can be made immediately.

After such measurement or other observation it is merely necessary to open the valve 6 in order completely to empty the device; the liquid flowing out by gravity or, if so desired, by a suction system to speed up drainage.

I claim:

1. A liquid sample container for use in the examination of liquid by means of visible or invisible light, comprising a body defining therein a recess or chamber for a liquid sample to be examined, said recess or chamber forming part of a first conduit defined in said body which conduit extends substantially vertically in the intended position of use of the container, a second conduit defined in said body substantially parallel to said first conduit, said first and second conduits being interconnected at their bottom ends, a liquid inlet pipe which forms a substantially coaxial continuation of the top end of said second conduit outwardly of said body, a suction pipe which forms a substantially coaxial continuation of the top end of said first conduit outwardly of said body, to enable liquid to be drawn into the said recess or chamber via said inlet pipe and said second conduit, and a substantially straight suction bypass passage interconnecting said first and second conduits and extending substantially at right angles to said conduits, said suction bypass passage being of substantially smaller diameter than the parts of the said conduits which it interconnects and communicating with the respective conduits at a level which is above the said recess or chamber when the container is in its intended position of use.

2. A container as claimed in claim 1, wherein the said first and second conduits and the connection therebetween at their bottom ends together form a substantially U-shaped conduit.

3. A container as claimed in claim 1, wherein the said liquid inlet pipe and the said suction pipe extend from a top surface of the body of the container.

4. A container as claimed in claim 3, wherein the said suction bypass passage is situated inwardly of and adjacent the said top surface of the body of the container.

5. A container as claimed in claim 1, wherein the said suction pipe is of smaller cross-sectional area than the part of the said first conduit extending between it and the said recess or chamber.

6. A container as claimed in claim 5, wherein the said inlet pipe is of smaller cross-sectional area than the part of the said second conduit of which it forms a continuation.

7. A container as claimed in claim 6, wherein the said parts of the first and second conduits are of substantially the same length and cross-sectional area.

8. A container as claimed in claim 1, including a drain conduit opening out the bottom end of said first conduit.